(12) United States Patent
Manfredi

(10) Patent No.: US 7,264,019 B2
(45) Date of Patent: Sep. 4, 2007

(54) CONTROLLED-FLOW HYDRAULIC DISTRIBUTOR

(75) Inventor: Danilo Manfredi, Felina Di Castelnuovo Monti (IT)

(73) Assignee: NEM S.p.A., Reggio Emilia (IT)

( * ) Notice: Subject to any disclaimer, the term of this patent is extended or adjusted under 35 U.S.C. 154(b) by 388 days.

(21) Appl. No.: 10/524,201

(22) PCT Filed: Dec. 17, 2002

(86) PCT No.: PCT/IT02/00798

§ 371 (c)(1),
(2), (4) Date: Feb. 10, 2005

(87) PCT Pub. No.: WO2004/055385

PCT Pub. Date: Jul. 1, 2004

(65) Prior Publication Data

US 2005/0223885 A1   Oct. 13, 2005

(51) Int. Cl.
*F16K 1/00*   (2006.01)
(52) U.S. Cl. .................. 137/614.2; 91/432; 91/439; 137/538
(58) Field of Classification Search ............... 137/538, 137/540, 614.2; 91/432, 46, 451, 452, 459, 91/468, 361
See application file for complete search history.

(56) References Cited

U.S. PATENT DOCUMENTS

| 393,596 | A | * | 11/1888 | Westinghouse, Jr. ......... 91/426 |
| 702,157 | A | * | 6/1902 | Schreidt ...................... 137/495 |
| 1,262,265 | A | * | 4/1918 | Samuel et al. ............ 123/25 C |
| 1,488,604 | A | * | 4/1924 | Lawton ...................... 137/512 |
| 1,722,920 | A | * | 7/1929 | Hynes .......................... 91/459 |
| 2,797,705 | A | * | 7/1957 | Frantz ..................... 137/614.2 |
| 2,868,224 | A | * | 1/1959 | Karlsson ..................... 137/495 |
| 2,944,527 | A | * | 7/1960 | Vander Kaay ........... 137/596.1 |
| 3,357,451 | A | * | 12/1967 | Tennis ......................... 137/596 |
| 3,621,879 | A | * | 11/1971 | Ticcioni et al. .......... 137/614.2 |
| 3,782,400 | A | * | 1/1974 | Hardison et al. ............. 137/39 |
| 3,921,666 | A |   | 11/1975 | Leiber |
| 4,189,285 | A | * | 2/1980 | Pauliukonis ................ 417/403 |
| 4,305,566 | A | * | 12/1981 | Grawunde ................ 251/30.02 |
| 4,899,785 | A | * | 2/1990 | Inokuchi ................. 137/625.65 |
| 4,903,578 | A | * | 2/1990 | Terp ............................ 91/499 |
| 4,981,281 | A |   | 1/1991 | Brundage et al. |
| 5,172,724 | A | * | 12/1992 | Tsuzuki et al. .......... 137/614.2 |
| 5,454,292 | A | * | 10/1995 | Oudelaar ..................... 91/446 |

(Continued)

FOREIGN PATENT DOCUMENTS

DE   33 17 259   11/1984
EP   0 645 291   3/1995

*Primary Examiner*—Eric Keasel
*Assistant Examiner*—Craig Price
(74) *Attorney, Agent, or Firm*—Young & Thompson

(57) ABSTRACT

The hydraulic distributor exhibits a cylindrical and internally-hollow body (2) having an inlet chamber (3) for a fluid and an outlet chamber (4) which are interconnected directly (by a communication conduit), or indirectly by an external distributor. A cursor (7) is axially mobile in the hollow body (2) and a closing element (12) is associated to the cursor (7) by elastic elements (11). The closing element (12) is mobile in the inlet chamber (3) between a first position in which it occludes the inlet chamber (3) and a second position in which it permits passage of fluid from an antechamber (3a) to a second opening (3b).

14 Claims, 2 Drawing Sheets

U.S. PATENT DOCUMENTS

| | | | |
|---|---|---|---|
| 5,656,986 A * | 8/1997 | Sassone et al. | 337/116 |
| 5,738,142 A * | 4/1998 | Eike et al. | 137/596.17 |
| 6,021,996 A | 2/2000 | Nakayoshi | |
| 6,832,625 B2 * | 12/2004 | Ford | 137/495 |
| 6,957,663 B2 * | 10/2005 | Hirota et al. | 137/613 |
| 2003/0172805 A1 * | 9/2003 | Lissel et al. | 91/452 |

* cited by examiner

CONTROLLED-FLOW HYDRAULIC DISTRIBUTOR

TECHNICAL FIELD

The invention relates to a controlled-flow hydraulic distributor. In particular, the invention relates to a hydraulic distributor and is particularly applicable in all mechanical fields where control of fluid flow is required (in the specific case the fluid is oil).

BACKGROUND ART

Mechanical applications based on the action of oil flow are very widespread. Oil flow is used, for example, to move mobile organs, or more specifically to control the movement of mobile organs.

For example, reference is made to hydraulic pistons used to move a user along a linear direction, or mobile propellers turned by rotating turbines.

In this situation, hydraulic distributors are used to control the oil flow and to regulate the fluid delivery.

Generally, hydraulic distributors are constituted by a chamber containing the oil interpositioned between the user organ and an oil outlet flow. The chamber is defined by a channel realised in an obturator inserted internally of a cylinder.

In more detail, the obturator is mobile internally of the cylinder in order selectively to displace the chamber to the outlet conduit to place the user organ in fluid communication with the outlet conduit.

The obturator is normally moved by a linear actuator, commonly an electromagnet, and is associated to elastic contrast means, such as for example helix springs predisposed to push the obturator in an opposite direction to the movement direction imposed by the linear actuator.

By controlling the linear actuator, and in particular (in the case of an electromagnetic actuator) by controlling the electrical current induced, the obturator can displace the chamber to the outlet conduit, compressing the springs and determining passage of fluid. If on the other hand the fluid flow is to be stopped, current passing through the electromagnet is interrupted and the obturator is displaced into the rest condition, in which the chamber is isolated from the outlet conduit by means of the pressure exerted by the helix springs. Thus, simply by manipulating the current in the linear actuator fluid passage or the stoppage thereof can be determined.

However, in many hydraulic systems in which the above-described known distributor is installed, it is necessary to regulate fluid delivery outletting from the distributor. This need derives from the variations the user organs can be subject to, such as for example variations in the loads on the pistons.

The outletting fluid delivery must in this situation be kept constant in order to guarantee correct functioning of the user organ independently of variations in external loads.

The prior art includes hydraulic distributors able to regulate the size of the hole between the chamber and the outlet conduit in order to keep the outletting flow constant despite variations in pressure.

This regulation is effected by means of an automatic electronic circuit acting on the electromagnet pilot current.

In more detail, the circuit comprises a sensor which detects the flow delivery entering the distributor, and in consequence of this varies the current to the electromagnet in order to determine the position of the obturator.

Delivery is thus kept constant by means of electronic circuit processing steps, which vary the above-mentioned hole on the basis of flow velocity.

The above-described hydraulic distributors however exhibit various drawbacks. The drawbacks are connected with the presence of electronic systems associated with the distributor.

Firstly, of course, these circuits need an electrical supply.

Also, the electronic circuit associated to the distributor is very unwieldy. In a small hydraulic system, use of a hydraulic distributor of the above-described type would be out of the question due to its size.

Further, another drawback is connected with the high production costs due to the presence of very precise electronic control and processing elements.

Finally, an important drawback is related to the unreliability inherent in regulation by electronic means. Electronic organs, apart from being needy of continuous maintenance inasmuch as they are made up of fragile components which are sensitive to damp, do not guarantee sufficient functionability in working conditions of a particular nature, such as those where there is high temperature variability, or presence of intense electromagnetic fields.

The aim of the present invention is to provide a distributor which can substantially obviate the above-described drawbacks.

An important aim of the present invention is to make available a hydraulic distributor which enables fluid flow management automatically and without use of electric or electronic organs. In particular, an important aim of the present invention is to provide a hydraulic distributor able automatically to maintain a constant, or nearly so, fluid flow rate in outflow using only mechanical components.

The above-described aims are achieved by the hydraulic distributor, which is characterised in that it comprises the technical solution as claimed in the appended claims.

DISCLOSURE OF INVENTION

Further characteristics and advantages of the present invention will better emerge from the detailed description that follows of a preferred but non-exclusive embodiment of the invention, illustrated purely by way of non-limiting example in the accompanying figures of the drawings, in which:

FIG. 3 shows a detail of the distributor of FIGS. 1 and 2.

Figure 1:
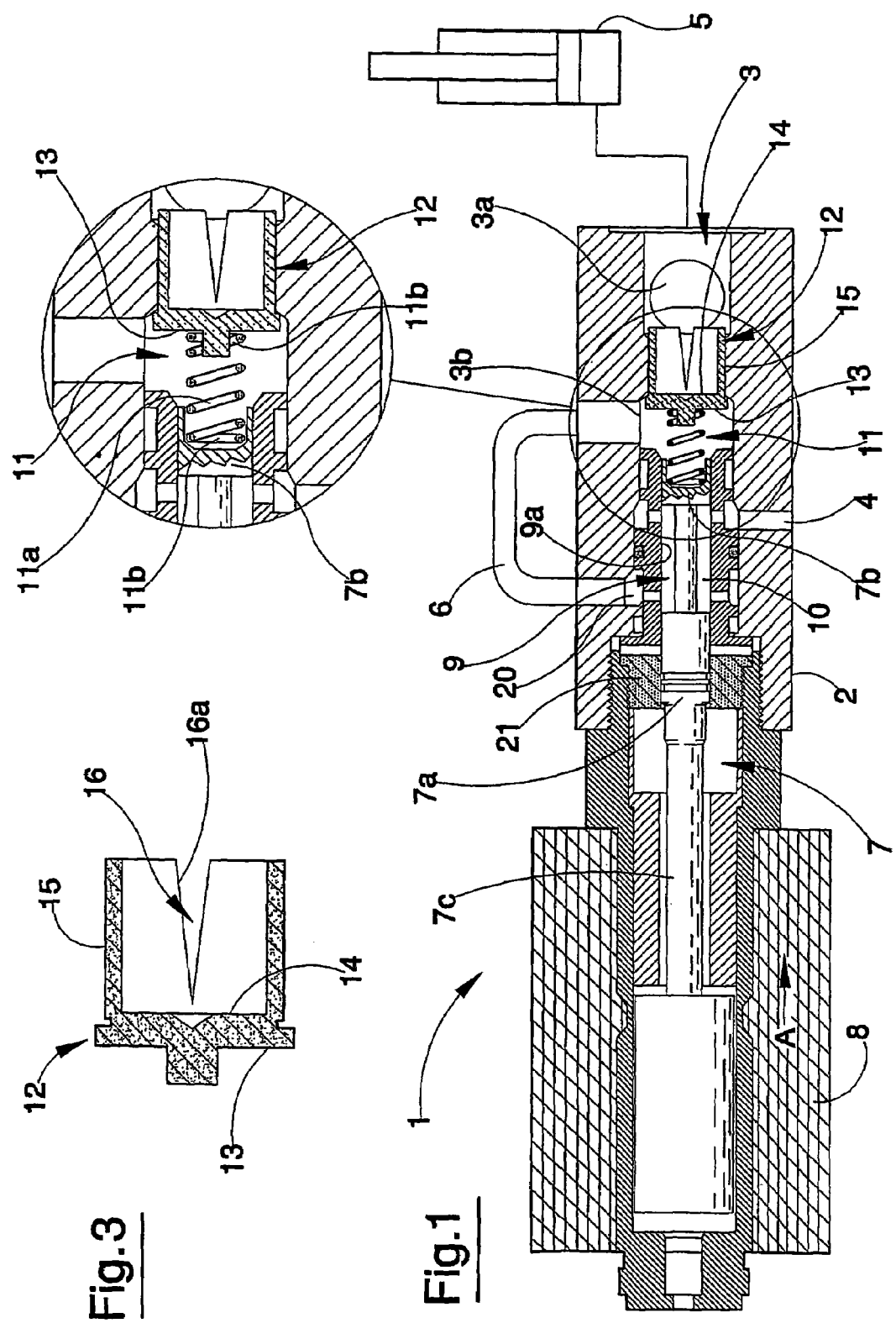
FIG. 1 is a vertical elevation of the distributor of the invention in a non-operative position, i.e. a rest position.

With reference to the figures of the drawings, the hydraulic distributor of the invention is denoted by 1.

The distributor 1 is constituted by an internally-cylindrical hollow body 2 including a fluid inlet chamber 3 and an outlet chamber 4. The inlet chamber 3 develops along the longitudinal axis of the hollow body 2, while the outlet chamber 4 is constituted by a conduit which is transversal to the axis of the inlet chamber 3.

The inlet chamber 3 comprises an ante-chamber 3a arranged at an end of the hollow body 2, and connected to an external organ 5 (illustrated indicatively as a hydraulic cylinder predisposed to direct the fluid into the inlet chamber 3), and also comprises a second opening 3b.

Figure 2:
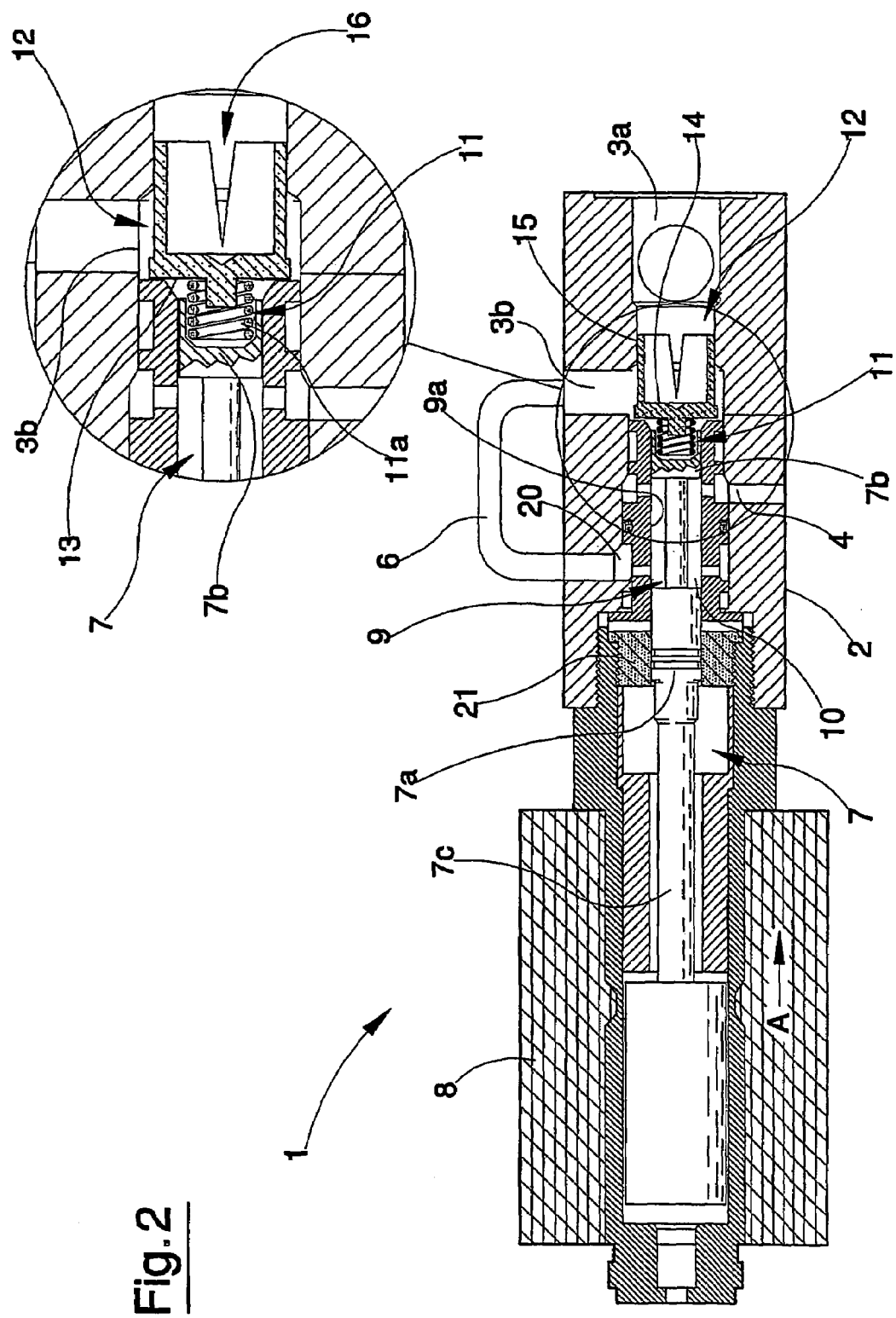
FIG. 2 is a vertical elevation of the distributor of the invention in an operative position.

In the illustrated embodiment, the distributor 1 includes a direct communication conduit 6 associated to the hollow body 2, which places the second opening 3b in fluid communication with the outlet chamber 4, through a second inlet chamber 20. In the embodiment of FIGS. 1 and 2 the communication conduit 6 connects the second opening 3*b* and the inlet chamber 20 directly, but it could be (depending on the use of the distributor 1) an indirect communication, i.e. the fluid exiting from the opening 3*b* could be sent to a second external distributor (not shown in the figures) piloted by a fluid intercepted from the chamber 20, the second external distributor being connected to the chamber 20. In this case, the outflow delivery 3*b* might not be the same as the delivery inflowing to the chamber 20, as shown in the illustrated embodiment, but will be however in relation to the delivery intercepted from the chamber 20.

This happens in cases where the distributor 1 is for example under the control of a variable-flow hydraulic pump, another distributor, a valve or any hydraulic cylinder.

Internally of the hollow body 2 a cursor 7 is mobile between a non-operative position in which it interrupts passage of fluid from the inlet chamber 3 to the outlet chamber 4, and at least one operative position in which it permits passage of fluid.

The cursor 7 is operatively associated to a linear actuator 8 which moves the cursor 7 in a direction A between the corresponding operative and non-operative positions.

In greater detail, the cursor 7 is constituted by a shaft 7*c* developing in direction A, coinciding with the longitudinal axis of the hollow body 2. The cursor 7 comprises a first end 7*b* facing the second opening 3*b* of the chamber 3 and a second end 7*c* associated to the linear actuator 8.

The linear actuator 8 can advantageously be constituted by an electromagnet of known type and therefore not further described and illustrated in detail. The electromagnet of the actuator 8 is supplied by electric or electronic organs of known type and not illustrated.

In this situation, the end 7*c* of the cursor 7 constitutes the nucleus of the electromagnet and, using the magnetic force generated by the current passing in a solenoid of the actuator, the cursor 7 is moved towards the inlet chamber 3.

Alternatively, the linear actuator 8 can also be constituted by a hydraulic piston or another similar type of movement organ.

The shaft 7*a* further exhibits an annular groove 9 made in the external surface of the shaft 7*a* and arranged in the intermediate part of the shaft 7*a*. In more detail, the groove 9, together with the internal surface 9*a* of the hollow body 2, defines an annular chamber 10.

As better illustrated in FIG. 1, the annular chamber 10 is always arranged at the second inlet chamber 20, whatever the position of the cursor 7.

When the cursor 7 is in the operative position (FIG. 2), the groove 9 in the shaft 7*a* is moved towards the outlet chamber 4, placing the chamber 10 in fluid communication with the outlet chamber 4. In this position, the conduit 6 and the chamber 10 place the second opening 3*b* of the inlet chamber 3 in fluid communication with the outlet chamber 4.

A plurality of annular chambers 20 can advantageously be made in the hollow body 2 and arranged concentrically along the longitudinal development of the hollow body 2. The annular chambers 20 are arranged between the annular chamber 10 and the conduit 6 and are predisposed to be in fluid communication with the chamber 10 and the conduit 6. Preferably, the annular chambers 20 are realised on the external surface of a tubular sleeve 21 inserted coaxially in the cylindrical body 2 and exhibiting an opening predisposed to receive the shaft 7*a*. A plurality of chambers 10 can also be provided (not illustrated in the figures), side-by-side and predisposed to be in communication with one or more of the chambers 20 to make the distributor 1 more versatile in all situations, even where a plurality of outlet chambers 4 or conduits 6 is required.

Elastic means 11 are situated internally of the second opening 3*b* of the inlet chamber 3, which act on the cursor 7 and a closing element 12 interpositioned between the antechamber 3*a* and the second opening 3*b*. The elastic means 11 are advantageously constituted by a helix spring 11*a* exhibiting two opposite ends 11*b*.

An end 11*b* of the spring 11*a* is associated to a first wall 13 of the closing element 12 and another end 11*b* thereof is associated to the first end 7*b* of the cursor 7. As mentioned above, the closing element 12 is interpositioned between the antechamber 3*a* and the second opening 3*b* and is mobile between a first rest position in which it closes the inlet chamber 3, and a second position in which is allows passage of fluid from the inlet chamber 3 to the communication conduit 6.

The closing element 12 advantageously exhibits a cylindrical development in which a first wall 13 is associated is associated to the spring 11*a* and faces the second opening 3*b* and a second wall 14 is opposite to the first wall 13 and faces the antechamber 3*a*; the second wall 14 has a planar development, parallel to the planar development of the first wall 13.

The closing element 12 further exhibits a lateral wall 15 associated to the first wall 13 and the second wall 14, which lateral wall 15 develops transversally to the planar development of the first wall 13 and the second wall 14.

The lateral wall 15 interacts with the internal surface of the hollow body 2 and, during movement between the first and second positions of the closing element 12, the lateral wall 15 slides on the internal surface. The lateral wall 15 also exhibits at least one shaped passage 16 for the fluid when the closing element 12 is in the corresponding operative position.

The closing element 12 preferably exhibits a tubular conformation, in which an end of the tubular conformation is closed by the first and second walls 13, 14.

In greater detail, the shaped passage 16 preferably exhibits a longitudinal development which is predominantly parallel to the movement direction A of the cursor 7.

Preferably, the shaped passage 16 is constituted by an incision 16*a* made in the lateral wall 15 and having a wedge shape, decreasing in breadth as it approaches the first wall 13.

Alternatively, the passage 16 can be shaped in any of various geometrical figures. For example, it could be constituted by one or more holes afforded in the lateral wall 15.

In this situation, when the closing element 12 is in the first position, the passage 16 is located in the antechamber 3*a* and is against the internal surface in order not to allow fluid to pass from the antechamber 3*a* to the second opening 3*b*.

When the closing element 12 is in the second position the passage 16 is partially located between the antechamber 3*a* and the second opening 3*b* to enable fluid to pass.

The operation of the distributor is as follows.

The hydraulic distributor 1 illustrated in FIG. 1 is arranged normally in the closed position, with no fluid free to pass.

A predetermined force is applied by the actuator 8 on the cursor 7 in direction A. This determines the displacement of the cursor 7 into an operative position (FIG. 2).

When the linear actuator 8 is activated, pushing the cursor 7 so that the annular chamber 10 is placed in communication between the conduit 6 and the outlet chamber 4, a depression is created at the second opening 3b, the conduit 6 and the outlet chamber 4. Owing to this depression, the fluid contained in the antechamber 3a (which is at a higher pressure than the second opening 3b) pushes the closing element 12 into the second position, compressing the spring 11a to place the passage 16 between the antechamber 3a and the second opening 3b and enabling fluid to move towards the outlet chamber 4.

In this situation, a stable condition of fluid flow in inlet and outlet from the distributor 1 is obtained.

In a case where the user organ 6 experiences a load increase, with a consequent increase of pressure and variation of fluid flow velocity entering the antechamber 3a, the closing element 12 is further pushed towards the second opening 3b, where it further increases compression on the spring 11a. In this condition, the flow is of a higher pressure at the antechamber 3a than at the second opening 3b, and pushes the closing element 12 against the second wall 14, offering a greater section of passage 16 for fluid passage. Thanks to the action of closing element 12 on the spring 11a, the force impressed by the actuator 8 on the cursor 7 is opposed and the cursor 7 is displaced towards the non-operative position. In this situation, the passage section defined between the annular chamber 10 and the outlet chamber 4 decreases, and consequently reduces the fluid flow pressure in outlet. At this point, the fluid pressure difference at the second wall 14 decreases again and the force impressed on the cursor 7 by the actuator 8 overcomes the opposition of the spring 11a and pushes the closing element 12 once more back towards the antechamber 3a.

In this way a dynamic equilibrium is obtained, thanks to the cooperation of the closing element 12, the spring 11a and the cursor 7, which enables, by means of the variation of the fluid passage section of the passage 16 and the annular chamber 10, a constant fluid outlet flow.

Note that on the basis of the excursion of the closing element 12 the passage 16 offers a fluid passage section which is adequate for regulating the fluid flow outletting from the second opening 3b.

Regulation of the passage section of the passage 16 is determined by the shape of the passage 16 (which is of variable breadth), which exhibits a greater section in which the pressure is greater than the antechamber 3a with respect to the chamber 3b.

Advantageously, as a constant force on the cursor 7 is determined, due to the passage of a constant current in the electromagnet, the distributor 1 will enable constant flow rate independently of the pressure at distributor 1 inlet.

The present invention overcomes the above-described drawbacks.

It is stressed that the distributor 1 includes no electronic element integrated into the distributor 1 itself. It is also to be stressed that the closing element 12, which operates on the regulation of the fluid flow, is inserted in the hollow body 2 and therefore does not produce any additional encumbrance.

The distributor 1 has the advantage of being compact and structurally simple and can be inserted in any hydraulic system.

Furthermore, the distributor 1 is very economical in that it exhibits only automatically mobile mechanical organs, and the closing element 12 exhibits a very simple structure.

Finally, it is stressed that the distributor 1 is very reliable and can be used in any technical sector, including special environments, without losing operational functionability.

The invention claimed is:

1. A controlled-flow hydraulic distributor, comprising:
    a cylindrical internally hollow body (2), exhibiting an inlet chamber (3) for a fluid and an outlet chamber (4);
    a cursor (7) associated to the hollow body (2) and mobile therein between a non-operative position in which the cursor (7) interrupts passage of the fluid from the inlet chamber (3) to the outlet chamber (4) and at least an operative position in which the cursor (7) allows passage of the fluid;
    a linear actuator (8), operatively associated to the cursor (7), for moving the cursor (7) in a direction (A) between the operative position and the non-operative position;
    elastic means (11) associated to the cursor (7);
    and a closing element (12) mobile in the inlet chamber (3);
    characterized in that the closing element (12) is associated to the elastic means (11) and is mobile between a first position in which it closes off the inlet chamber (3) and a second position in which it permits passage of fluid from the inlet chamber (3) to a second opening (3b); the inlet chamber (3) comprising the second opening (3b), which is connected directly or indirectly to a second inlet chamber (20), and an antechamber (3a) into which fluid is supplied via an external organ; the closing element (12) being interpositioned between the antechamber (3a) and the second opening (3b).

2. The distributor of claim 1, wherein the closing element (12) comprises a first wall (13) associated to the elastic means (11) and facing the second opening (3b) and a second wall (14) opposite the first wall (13), which faces the antechamber (3a).

3. The distributor of claim 2, wherein the closing element (12) comprises a lateral wall (15) associated to the first wall (13) and the second wall (14), which lateral wall (15) is in contact with an internal surface of the hollow body (2), which internal surface defines the inlet chamber (3); the lateral wall (15) affording at least a passage (16).

4. The distributor of claim 3, wherein the passage (16) exhibits a longitudinal development which is predominantly parallel to a movement direction (A) of the cursor (7).

5. The distributor of claim 1, wherein the closing element (12) exhibits a cylindrical development.

6. The distributor of claim 3, wherein the passage (16) comprises an incision (16a) having a decreasing breadth as it progresses towards the first wall (13).

7. The distributor of claim 3, wherein the passage (16) is constituted by at least one hole.

8. The distributor of claim 1, wherein the cursor (7) comprises a shaft (7a) having a longitudinal development which is parallel to direction (A) and which exhibits a first end (7b) which is operatively engaged with the elastic means (11) and a second end (7c) which is associated to the linear actuator (8).

9. The distributor of claim 8, wherein the elastic means (11) comprise a helix spring (11a) exhibiting two ends (11b), an end of which two ends (11b) is associated to the first wall (13) and another end of which two ends (11b) is associated to the shaft (7a); the spring (11a) being compressed by effect of a movement into the operative position of the cursor (7) and by effect of a movement of the closing element (12).

10. The distributor of claim 9, wherein the shaft (7a) exhibits at least one annular groove (9) made in an external surface of the shaft (7a) and arranged between the first end (7b) and the second end (7c) thereof; the groove (9) defining, in collaboration with the internal surface (9a) of the hollow body (2), an annular chamber (10).

11. The distributor of claim 10, wherein the annular chamber (10) is in communication with the second inlet chamber (20).

12. The distributor of claim 11, wherein the annular chamber (10) is in communication with the outlet chamber (4) when the cursor (7) is arranged in the operative position.

13. The distributor of claim 1, wherein the linear actuator (8) comprises an electromagnet.

14. The distributor of claim 1, wherein the linear actuator (8) comprises a hydraulic piston.

* * * * *